(12) United States Patent
Leimbach

(10) Patent No.: US 12,732,557 B2
(45) Date of Patent: Sep. 8, 2026

(54) FACILITATING DYNAMIC ADJUSTMENT OF CONSENSUS PARAMETERS BASED ON CONFIGURATION OPERATIONS IN A DISTRIBUTED SYSTEM OF ADVANCED COMMUNICATION NETWORKS

(71) Applicant: Dell Products L.P., Round Rock, TX (US)

(72) Inventor: David T. Leimbach, Mechanicsburg, PA (US)

(73) Assignee: DELL PRODUCTS L.P., Round Rock, TX (US)

( * ) Notice: Subject to any disclaimer, the term of this patent is extended or adjusted under 35 U.S.C. 154(b) by 101 days.

(21) Appl. No.: 18/786,122

(22) Filed: Jul. 26, 2024

(65) Prior Publication Data

US 2026/0032173 A1 Jan. 29, 2026

(51) Int. Cl.

*H04L 12/24* (2006.01)
*H04L 41/0803* (2022.01)
*H04L 67/104* (2022.01)
*H04L 67/1097* (2022.01)

(52) U.S. Cl.

CPC ...... *H04L 67/1048* (2013.01); *H04L 67/1097* (2013.01)

(58) Field of Classification Search

CPC ........................ H04L 67/1048; H04L 67/1097
USPC .......................................................... 709/203
See application file for complete search history.

(56) References Cited

U.S. PATENT DOCUMENTS

2020/0073717 A1* 3/2020 Hari ...................... G06F 9/5061
2021/0081432 A1* 3/2021 Grunwald ........... G06F 11/1471
2021/0116878 A1* 4/2021 Law ......................... G05B 9/03
2021/0117443 A1* 4/2021 Zheng ................... G06F 16/273
2021/0120070 A1* 4/2021 Ponce ................ H04L 12/4641
2021/0132928 A1* 5/2021 Xiao ..................... H04L 9/3239
2021/0182116 A1* 6/2021 Muleshkov ......... G06F 11/1482
2021/0182270 A1* 6/2021 Meneghetti ......... G06F 16/2379
2023/0062434 A1* 3/2023 Wagner ................ G06Q 20/405
2024/0231873 A1* 7/2024 Jigalur ................ G06F 9/45558
2024/0314159 A1* 9/2024 Buttolph ............. H04L 63/1441
2024/0320146 A1* 9/2024 Karr ...................... G06F 3/0616
2024/0420136 A1* 12/2024 Bazzi .................... H04L 9/3263

* cited by examiner

*Primary Examiner* — Ario Etienne
*Assistant Examiner* — Elizabeth Kassa
(74) *Attorney, Agent, or Firm* — Amin, Turocy & Watson, LLP

(57) ABSTRACT

Facilitating dynamic adjustment of consensus parameters based on configuration operations in a distributed system is provided. A method includes determining an operation is to be implemented for nodes of a group of nodes of a distributed computing environment. A first response specification of a consensus procedure is a function of a first response quantity that is based on a first quantity of nodes determined to be in the group of nodes. The method also includes, based on the operation being determined to be a defined operation, reducing the first response quantity based on a number of defined nodes determined to be associated with the defined operation, resulting in a second response quantity. Further, the method includes, based on an amount of responses received in reply to a request to implement the defined operation being determined to satisfy the second response quantity, facilitating implementation of the defined operation.

20 Claims, 10 Drawing Sheets

FACILITATING DYNAMIC ADJUSTMENT OF CONSENSUS PARAMETERS BASED ON CONFIGURATION OPERATIONS IN A DISTRIBUTED SYSTEM OF ADVANCED COMMUNICATION NETWORKS

BACKGROUND

Distributed storage systems and/or object storage systems can provide a wide range of storage services while achieving high scalability, availability, and serviceability. In a distributed storage system, a cluster is a collection of computer nodes that cooperate to provide a file system across the nodes with data protection and protocol access, among other features. Each node contains a copy of the primary configuration for the cluster. A file (which can be referred to as an array.xml), holds this data. The file describes the basic cluster membership, node types, and some of the state of those nodes (read-only states etc.). When a node experiences a catastrophic failure and cannot be restored, the node should be removed from the cluster.

The above-described context with respect to communication networks is merely intended to provide an overview of current technology and is not intended to be exhaustive. Other contextual descriptions, and corresponding benefits of some of the various non-limiting embodiments described herein, will become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An embodiment relates to a method that includes determining, by a system comprising at least one processor, that an operation is to be implemented for nodes of a group of nodes of a distributed computing environment. Performance of the operation is based on a consensus procedure. A first response specification of the consensus procedure is a function of a first response quantity that is based on a first quantity of nodes determined to be in the group of nodes. The method also includes, based on the operation being determined to be a defined operation, reducing, by the system, the first response quantity based on a number of defined nodes determined to be associated with the defined operation, resulting in a second response quantity. Further, the method includes, based on an amount of responses received in reply to a request to implement the defined operation being determined to satisfy the second response quantity, facilitating, by the system, implementation of the defined operation. In an example, the distributed computing environment is configured to operate according to at least a fifth generation radio network communication protocol.

In some implementations, the method includes, based on the operation being determined to be the defined operation and based on the amount of responses received in reply to the request to implement the defined operation being determined to fail to satisfy the second response quantity, determining, by the system, that the defined operation is not to be implemented.

The defined operation can be a node remove operation. Further, the defined nodes determined to be associated with the defined operation comprise nodes identified in the node remove operation for removal from the group of nodes, resulting in remaining nodes of the group of nodes. Further to these implementations, the group of nodes is a first group of nodes, a first configuration is associated with the first group of nodes, and the method can include determining, by the system, a second configuration of the remaining nodes of the group of nodes. The method can also include communicating, by the system, the second configuration to the remaining nodes of the group of nodes.

The defined operation can be a smart fail operation. Further, the defined nodes determined to be associated with the defined operation comprise nodes identified in the smart fail operation as nodes that have experienced a failure event. The method can include removing, by the system, the defined nodes from the group of nodes, resulting in remaining nodes of the group of nodes. Further to these implementations, the group of nodes is a first group of nodes, a first configuration is associated with the first group of nodes, and the method further includes determining, by the system, a second configuration of the remaining nodes of the group of nodes. The method also includes communicating, by the system, the second configuration to the remaining nodes of the group of nodes.

In some implementations, the first response quantity of the first response specification is a first quorum a total amount of nodes in the group of nodes. Further, the second response quantity of a second response specification is a second quorum of a remaining amount of nodes in the group of nodes after the reducing.

The method can include, according to some implementations, based on the operation being determined not to be the defined operation, determining, by the system, whether a number of responses satisfy the first response quantity. The method can also include, based on the number of responses being determined to satisfy the first response quantity, facilitating, by the system, an implementation of the operation. Further, the method can include, based on the number of responses being determined not to satisfy the first response quantity, determining, by the system, that the operation is not to be implemented.

Another embodiment relates to a system that includes at least one processor and at least one memory that stores executable instructions that, when executed by the at least one processor, facilitate performance of operations. The operations can include based on a first determination that a defined command is to be implemented for nodes of a group of nodes of a distributed computing environment, modifying a response parameter associated with a consensus procedure for implementation of the defined command. The modifying can include reducing a number of nodes participating in the consensus procedure by a quantity of nodes with respect to which the defined command is to be implemented, resulting in a modified response parameter. The operations can also include, based on a second determination that a response quantity satisfies the modified response parameter, initiating the defined command. Further, the operations can include, based on a third determination that the response quantity fails to satisfy the modified response parameter, determining that the defined command is not to be implemented.

In an example, the defined command is a node remove command. In another example, the defined command is a smart fail command. Further, the modified response parameter is based on a quorum of a remaining amount of nodes in the group of nodes after the reducing of the number of nodes participating in the consensus procedure. In an example, the distributed computing environment is configured to operate according to at least a new radio network communication protocol.

Yet another embodiment relates to a non-transitory machine-readable medium, comprising executable instructions that, when executed by at least one processor of network equipment, facilitate performance of operations. The operations can include determining that an command is to be implemented for nodes of a group of nodes of a distributed computing environment. An implementation of the command is based on a consensus procedure. A first response requirement of the consensus procedure is based on a first response quantity that is a function of a quantity of nodes determined to be in the group of nodes. The operations can also include, based on the command being determined to be a defined command, reducing the first response quantity by a number of defined nodes determined to be associated with the defined command, resulting in a second response quantity. Further, the operations can include, based on a number of positive responses received in reply to a request to implement the defined command being determined to satisfy the second response quantity, implementing the defined command.

In an example, the defined command is a node remove command or a smart fail command. According to some implementations, the operations can include, based on the command being determined to be the defined command and based on the second response quantity being determined not to be satisfied, foregoing the implementing of the defined command.

To the accomplishment of the foregoing and related ends, the disclosed subject matter includes one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which.

DETAILED DESCRIPTION

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

One example computing platform that can optionally incorporate the dynamic adjustment of consensus parameters based on configuration operations techniques disclosed herein is an ISILON OneFS® cluster provided by DELL®, Inc. It can be appreciated that OneFS® clusters are one of many optional cluster computing technologies, any of which can incorporate the teachings of this disclosure.

As alluded to above, when a node experiences catastrophic failure and cannot be restored, the node should be removed from the cluster. However, due to a consensus procedure where a majority of nodes need to positively reply to the removal request, the loss of the node might prevent such removal from occurring. Accordingly, unique challenges exist related to consensus procedures and in view of Fifth Generation (5G)-new radio (NR), Sixth Generation (6G), or other next generation, standards for network communication, and various embodiments described hereinbelow address issue(s) with such consensus procedure.

Figure 1:
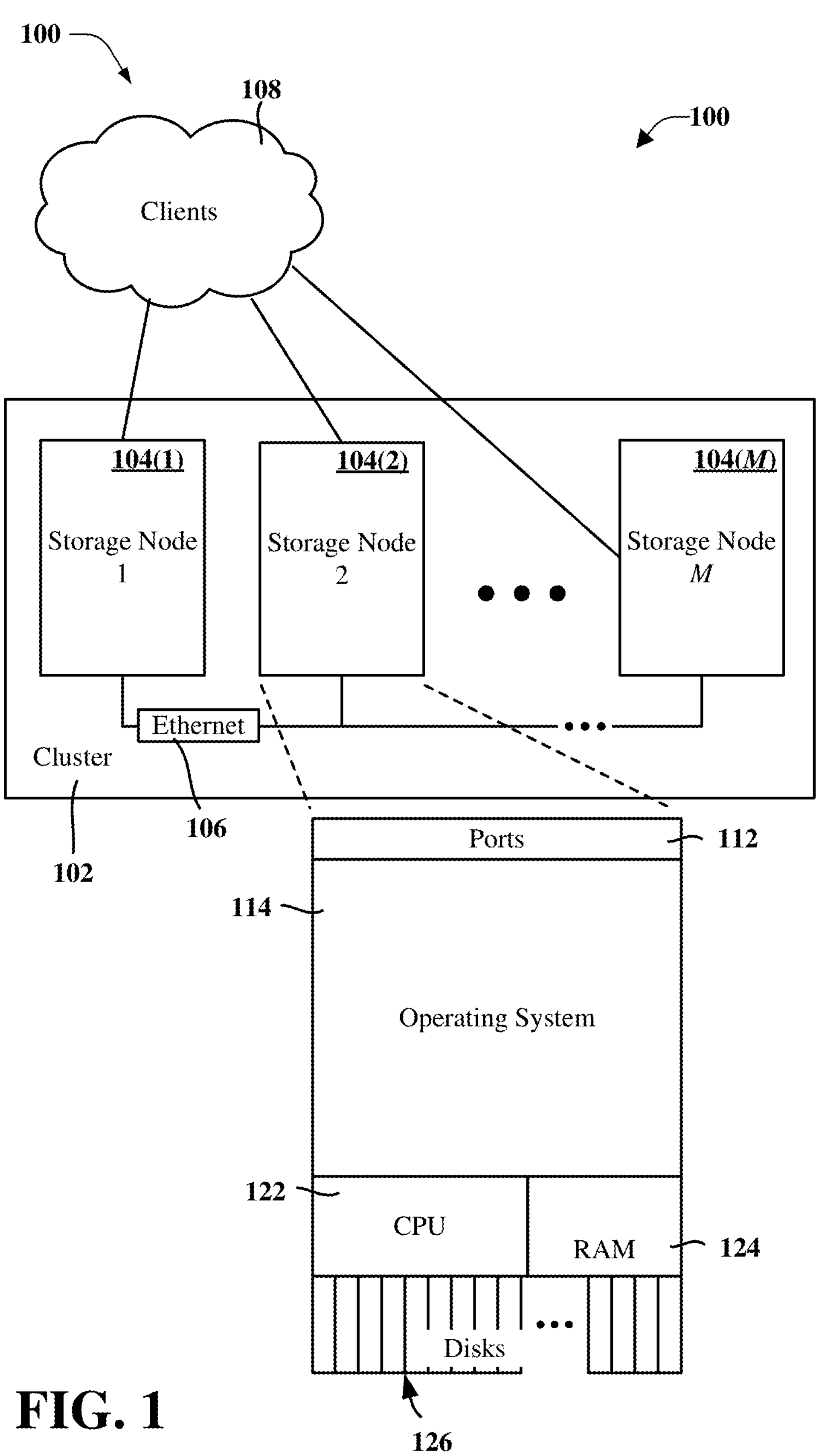
FIG. 1 illustrates an example cluster of computing devices, in accordance with one or more embodiments described herein.

FIG. 1 illustrates an example cluster of computing devices, in accordance with one or more embodiments described herein. FIG. 1 includes a cluster 102 of data node devices, referred to in FIG. 1 as storage nodes 104(1), 104(2) . . . 104(M), where M is a positive integer. Each storage node 104(1), 104(2) . . . 104(M) can comprise a computing device. Storage nodes 104(1), 104(2) . . . 104(M) can be configured to serve objects in response to requests from clients 108. Furthermore, typically one of the storage nodes 104(1), 104(2) . . . 104(M) can host a cluster controller virtual machine (not shown in FIG. 1), making that node the cluster controller node which administers the cluster 102. The storage nodes 104(1), 104(2) . . . 104(M) can be coupled to one other via a suitable data communications link comprising interfaces and protocols such as, but not limited to, Ethernet block 106.

Clients 108 can send data system-related requests to the cluster 102, which, in general, can be configured as one large object namespace. The cluster 102 can maintain an unlimited number of objects (e.g., up to trillions of objects or more). To this end, a node, such as the storage node 104(2), generally comprises ports 112 by which clients 108 connect to the cluster 102. Example ports 112 are provided for requests via various protocols, including, but not limited to, SMB (Server Message Block), FTP (File Transfer Protocol), HTTP/HTTPS (Hypertext Transfer Protocol), and NFS (Network File System); further, SSH (Secure Shell), for example, allows administration-related requests.

Each node, such as the node 104(2), can include an instance of an operating system 114 (e.g., a OneFS® or other operating system). Each node, such as the node 104(2), can furthermore include a CPU 122, RAM 124, and storage devices such as disks 126. RAM 124 and disks 126 can comprise, for example, volatile memory, nonvolatile memory, hard disk drives, solid-state drives, or other types of memory devices. Furthermore, RAM 124 and disks 126 at multiple of the storage nodes 104(1)-104(M), as well as other storage devices attached to the cluster 102, can be used to collectively support a logical disk which provides a shared storage location for the cluster 102.

It is noted that cluster deployments can be of any size. Depending on the demands, specifications, and requests of a particular organization, some clusters can comprise five or fewer nodes, while large clusters can comprise much larger numbers of nodes. The technologies disclosed herein can be included in clusters of any size.

It is noted that for cluster deployments or distributed filesystems configuration parameters that primarily contain the composition of the cluster file system can be retained in a data structure, such as, for example, a memory or storage device. A cluster is a collection of computer nodes that cooperate to provide a file system across those nodes with data protection and protocol access and a multitude of features. The primary configuration for that cluster is stored in a file that is shared around that cluster. For example, in some deployments, the file is referred to as an "array.xml."

The array.xml is replicated around the cluster to each node using a consensus process. For example, the consensus process can be implemented using a Paxos process or protocol. Paxos is a family of protocols for solving consensus in a network of unreliable or fallible processors. Consensus is the process of agreeing on one result among a group of participants. The consensus process discussed herein is operated on all nodes of a cluster, not just a sub-set of nodes. Thus, every single node in the cluster has a vote and the results of the vote, in order for the item being voted on to be approved, requires a threshold number or percentage of votes, e.g., a majority of votes.

The use of the consensus process as discussed herein is different from some ways of using a consensus process where only a subset of nodes are involved in the consensus. Thus, if some nodes of the subset of nodes are down, e.g., failed, certain operations cannot be performed, which is one part of what is being avoided with one or more of the disclosed embodiments herein. Further, the use of only some nodes (e.g., the subset of nodes) complicates the consensus process; this complication is another part of what can be avoided with one or more of the disclosed embodiments herein. Thus, the disclosed embodiment can be implemented in an environment where the consensus process is not just in place for managing the configuration, but also usable to manage the membership of the participants in that consensus process.

Figures 2A, 2B:
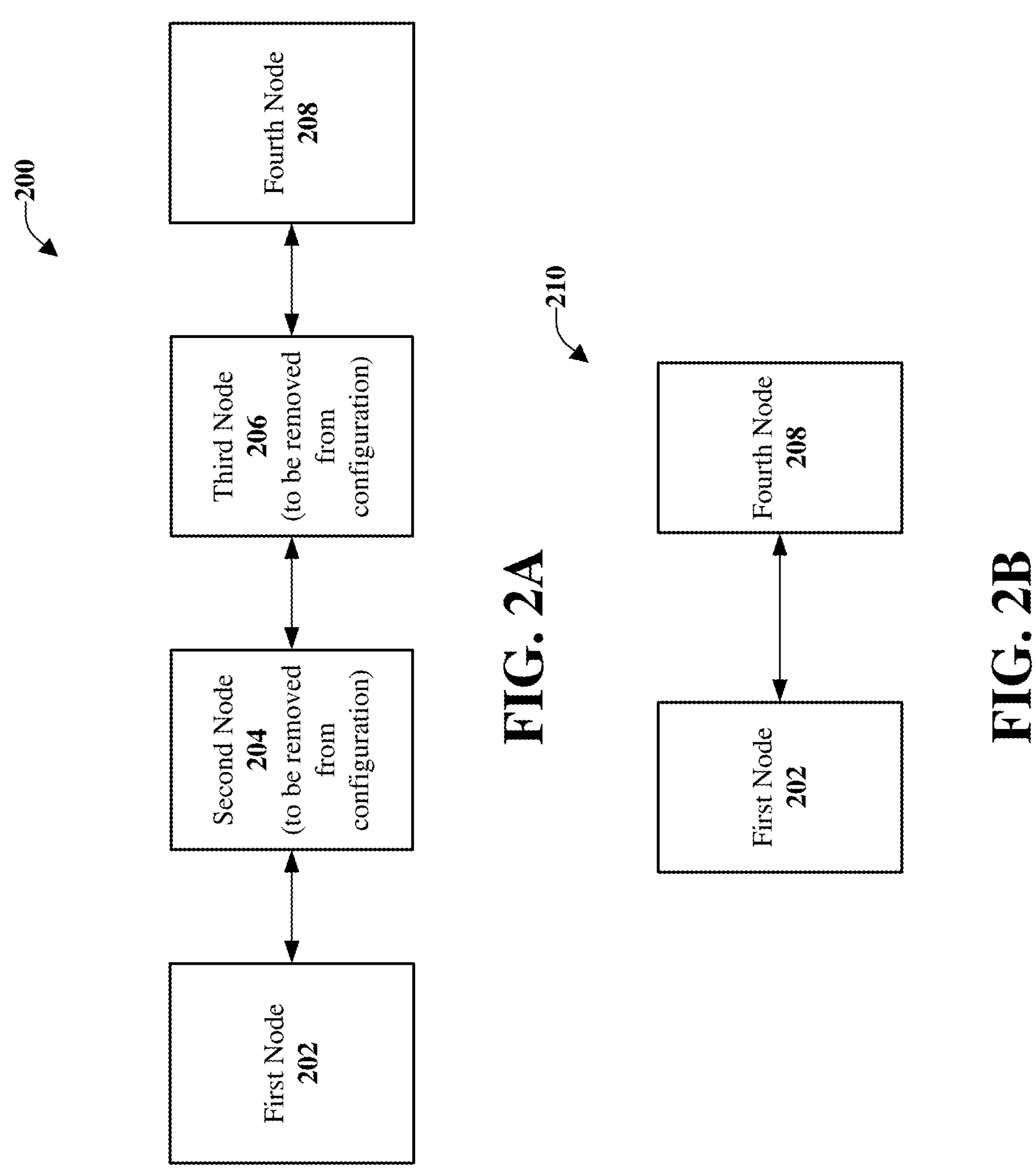
FIG. 2A illustrates an example, non-limiting, first configuration of a 4-node cluster, in accordance with one or more embodiments described herein.
FIG. 2B illustrates an example, non-limiting, second configuration of the 4-node cluster of FIG. 2A after removal of nodes that are associated with a defined command, in accordance with one or more embodiments described herein.

As mentioned, when a node is to be added, removed, or another action that changes the configuration of the cluster, a consensus process is performed. Generally, the consensus process should have a majority of the replicas of the agents running that maintain the replicas on each node to agree to accept that change. For example, FIG. 2A illustrates an example, non-limiting, first configuration of a cluster 200 that comprises four nodes, namely, a first node 202, a second node 204, a third node 206, and a fourth node 208. The cluster 200 can be similar to the cluster 102 of FIG. 1.

In this example, the second node 204 and the third node 206 have become unusable for the cluster (e.g., have malfunctioned, have lost connectivity, and so on). Therefore, it is determined that a node remove operation (or a fail safe operation) is to be implemented to remove those two nodes from the cluster configuration. However, the consensus process specifies that consensus is not reached without, for example, a majority or quorum of the nodes. Thus, in this example, for the consensus process to succeed, three nodes need to agree to the operation of removing the two nodes. Since two nodes are bad and are not expected to reply, there is no majority of nodes (e.g., half of the participants are down). Accordingly, as discussed herein, a forgiveness to the consensus process is built in for defined operations, such as node removal and fail safe operations. This forgiveness is saying that a response from those nodes being removed, or those nodes in a fail safe mode, is not expected. Therefore, those nodes can be removed from a determination of the total number of nodes, which impacts the quorum number. Accordingly, in this example, a second configuration 210, as illustrated in FIG. 2B, is created and communicated to the remaining nodes, the first node 202 and the fourth node 208. Provided that a majority of these nodes accepts the second configuration, the transaction or operation succeeds.

The scenario where multiple nodes fail or are rendered inoperable is more prevalent in cloud spaces. This is because in cloud spaces (e.g., cloud environments, virtual environments), the hardware nodes are usually virtualized, and are slightly less reliable. Such hardware nodes can fail in catastrophic ways, and frequently do not return to the cloud environment. It is noted that the example of FIGS. 2A and 2B is a special case for a node cluster where losing two nodes does not lose any data. Accordingly, the disclosed embodiments provide for being able to recover from it in a way that does not require manual handholding, and this is the way to automate that in order to allow the use of normal operation.

Figure 3:
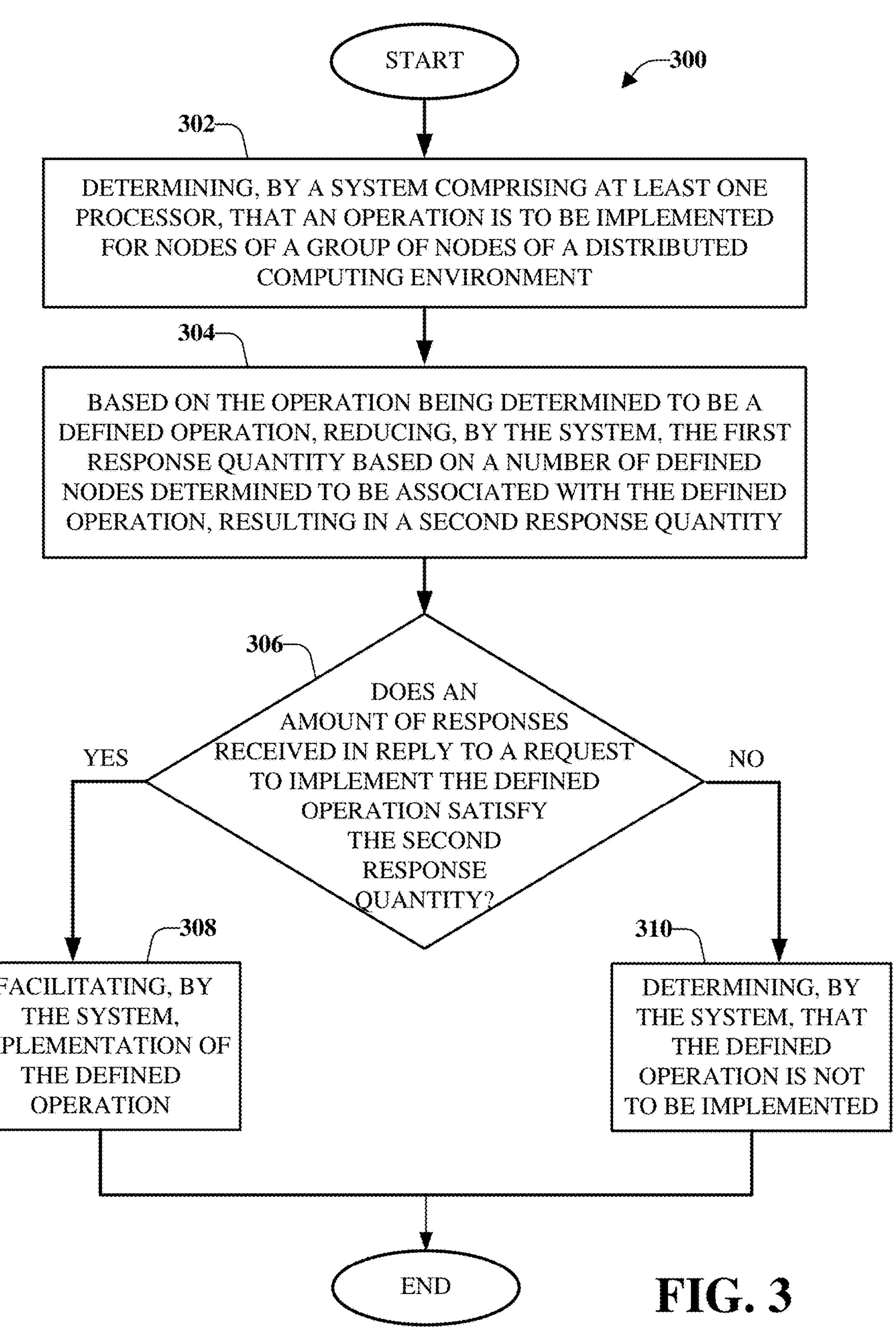
FIG. 3 illustrates an example, non-limiting, flow diagram of an example, non-limiting, computer-implemented method that facilitates dynamic adjustment of consensus parameters based on configuration operations in a distributed system in accordance with one or more embodiments described herein.

FIG. 3 illustrates an example, non-limiting, flow diagram of an example, non-limiting, computer-implemented method 300 that facilitates dynamic adjustment of consensus parameters based on configuration operations in a distributed system in accordance with one or more embodiments described herein. The computer-implemented method 300 and/or other methods discussed herein can be implemented by network equipment comprising a processor. According to another example, the computer-implemented method can be implemented by a system comprising a processor and a memory.

The computer-implemented method 300 starts, at 302, with a determination that an operation is to be implemented for nodes of a group of nodes of a distributed computing environment. Performance or implementation of the operation can be based on a consensus procedure. A first response specification of the consensus procedure can be a function of a first response quantity that is based on a quantity of nodes determined to be in the group of nodes. For example, if a group of nodes comprises 10 nodes, then the consensus procedure can require that a quorum of the nodes (e.g., 6 nodes out of the 10 nodes) is to agree to the operation in order for the operation to be implemented. Therefore, the first response quantity, in this first example, is 6 nodes. In another example of 13 nodes, a quorum of nodes would be at least 7 nodes. Therefore, according to this other example, the first response quantity is 7 nodes.

In yet another example, a group of nodes can comprise 4 nodes and the first response quantity is 3 nodes. Therefore, in this example, the operation can only be implemented if 3 nodes response affirmatively to implement the operation. However, if 2 of the 4 nodes are no longer available (e.g., have failed, no longer have connectivity, etc., and are otherwise unresponsive), the operation might be a remove node operation and/or a fail safe operation, which are examples of a defined operation. Thus, at 304, based on the operation being determined to be the defined operation, the computer-implemented method 300 reduces the first response quantity based on a number of defined nodes determined to be associated with the defined operation, resulting in a second response quantity. Continuing the above example, the first response quantity is three, which represents a majority of the 4 nodes. Since 2 nodes are to be removed, the number of nodes is reduced to 2 and, therefore, only 1 or 2 nodes are needed to respond to satisfy the quorum requirement.

At 306, a determination is made whether an amount of responses received in reply to a request to implement the defined operation satisfies the second response quantity. If the amount of responses received is determined to satisfy the second response quantity ("YES"), at 308, implementation of the defined operation is facilitated. Alternatively, if the number of responses received fails to satisfy the second response quantity, at 310, it is determined that the defined operation is not to be implemented.

As mentioned above, one example computing platform that can optionally incorporate the various embodiment disclosed herein is an ISILON OneFS® cluster provided by DELL®, Inc. It can be appreciated that OneFS® clusters are one of many optional cluster computing technologies, any of which can incorporate the teachings of this disclosure.

On a OneFS cluster, each node contains a copy of a primary configuration for the cluster. A file called array.xml, holds this data. The file (e.g., array.xml) describes the basic cluster membership, node types, and some of the state of those nodes (e.g., read-only states and so on). When a node experiences a catastrophic failure and cannot be restored, the node still should be removed from the cluster. If not removed, the node will potentially prevent a different quorum being reached (e.g., Group Management Protocol (GMP) quorum) that will cause data to be unavailable to clients regardless of the protection level of the data in play.

For example, on a 4 node cluster where data is protected at +2n (can lose up to two nodes with data intact), losing 2 nodes creates a loss of both the GMP and Paxos quorums. A lack of GMP quorum means no protocol services and/or client services can be started for customers to access their data. The lack of Paxos quorum means there is nothing the system can do to extend the cluster membership and/or shrink the cluster membership. Thus, being able to provide some level of "forgiveness" to the computation of the Paxos quorum is beneficial in order to recover from this situation with normal cluster operations and is provided herein.

A OneFS cluster uses a modified version of Paxos to process configuration changes in an eventually consistent manner. Part of that process requires a majority of the replicas of this state to be available for updating. However, in certain conditions, the configuration that is attempting to be changed will *remove* replicas (and indeed the entire node) from the cluster under consensus, and thus, it makes sense to adjust the process parameters slightly during specific operations.

An advantage of one or more of the example embodiments herein is at least in part due to the fact that a version of Paxos is being used to not only control the parameters of cluster membership across nodes, but the membership of the cluster itself. Normally, a value under consensus for Paxos would not also include the membership of the participants of those transactions. Since both are being performed, there is room to add some level of "forgiveness" to these processes.

In a normal Paxos transaction, a proposed change would not continue if there were not available a majority of replicas in which to update the state of the cluster, but since the disclosed embodiments are interested in removing nodes (via smart fail or a removal operation), it does not make sense in all cases to absolutely require that the nodes being removed are responsive.

As provided herein, on a +2n cluster up to 2 nodes can be lost and still have the data be protected, but on a 4-node cluster, the data is not available after losing 2 nodes due to a lack of GMP quorum. Conventional solutions do not work to restore data availability.

Various embodiments are discussed with respect to Paxos, however, other types of consensus procedures and protocols can be utilized. In further detail, in a OneFS cluster a GMP (group management protocol) subsystem can be used to communicate knowledge about the status of the cluster. Basic information reflected in GMP provides a sort of "online status" where nodes may be "up" or "down" within a given group. Nodes that are "up" within GMP are fully connected to every other node in the cluster and agree on the basic configuration of the cluster which includes the basic makeup of each node, IP addresses, and a node state. That basic configuration is managed by an external system which is replicated to each node and maintained by a consensus protocol based on Paxos in a normal file called array.xml managed by a service referred to isi_array_d which takes on the roles of Acceptor and Learner in a traditional Paxos arrangement.

This basic configuration is currently available for reads from the local replica, with updates requiring a quorum of available isi_array_d services to agree to accept a configuration update. Thus, array.xml is an "eventually consistent" value, and isi_array_d implements processes to catch up with changes that may have been missed for any reason. Once a node is fully caught up with the configuration of majority of the cluster, it will be allowed to merge with the GMP majority group.

A node is "down," in the GMP sense, if it is considered unhealthy. Unhealthy could mean not fully connected, or overloaded such that it misses too many ping responses, powered off, and so on. Or it may be that the node has been added to the cluster but has never fully connected to all other nodes. From the fully connected portion of a cluster, any number of nodes might appear as "down." From the view of a "down" node, it might see itself as the only node that is "up," with the majority of the cluster "down." Or it may be that a "down" node has truly failed and is not responsive.

A distributed lock system (LK) operates within GMP groups. That is to say, locks are coordinated within any GMP group. A node that is isolated from the majority group (does not have GMP quorum) will coordinate locks within its minority group, but those locks are granted without cluster-wide consensus, thereby defeating the purpose of a distributed lock system. Thus, implementations disallow any file system IO operations from a minority GMP group to avoid any chance of corruption from such "false locks".

A join operation (join) itself requires both GMP and Paxos quorums in order to add a node to a cluster. The following discusses a GMP Quorum for a join operation. Join requires knowledge of the upgrade state in order to perform leader election as well as run the appropriate cluster-side join checks. The upgrade state is presently stored within the file system itself. The join process needs to know that both a cluster is upgrading, and which nodes have been upgraded to elect a leader among the isi_join_d processes. Paxos quorum is needed to make the configuration changes necessary to a majority array.xml replicas, to add a new node to a cluster.

A SmartFail operation and/or a node remove operation cannot be utilized to restore a quorum. For the same or similar reasons discussed above, join cannot add a node to a cluster (lack of Paxos quorum across array.xml replicas), thus, removing a node or SmartFailing a node cannot be performed in order to restore quorum.

Therefore, if a cluster of 4 nodes has 2 nodes down from the GMP perspective, and it is determined that those nodes are not recoverable, data will not be able to be accessed until some nodes are removed from the cluster as joining new nodes is also not possible. Conventionally, there is no operation for a OneFS cluster to do this, and it will require manual intervention to edit array.xml files appropriately on each remaining node to remove nodes from the cluster. This is an otherwise safe operation due to the +2n protection provided by a 4-node cluster.

Conventional processes perform the following steps. First, the array.xml is edited on the up nodes, node1 and node2, to delete block for node4 and disable the checksum. Next both nodes are rebooted. Then, the IP range is expanded. Upon or after the IP range is expanded, a fifth node is added. This conventional process works, but is clumsy and prone to error, requiring support engagement.

Figure 4:
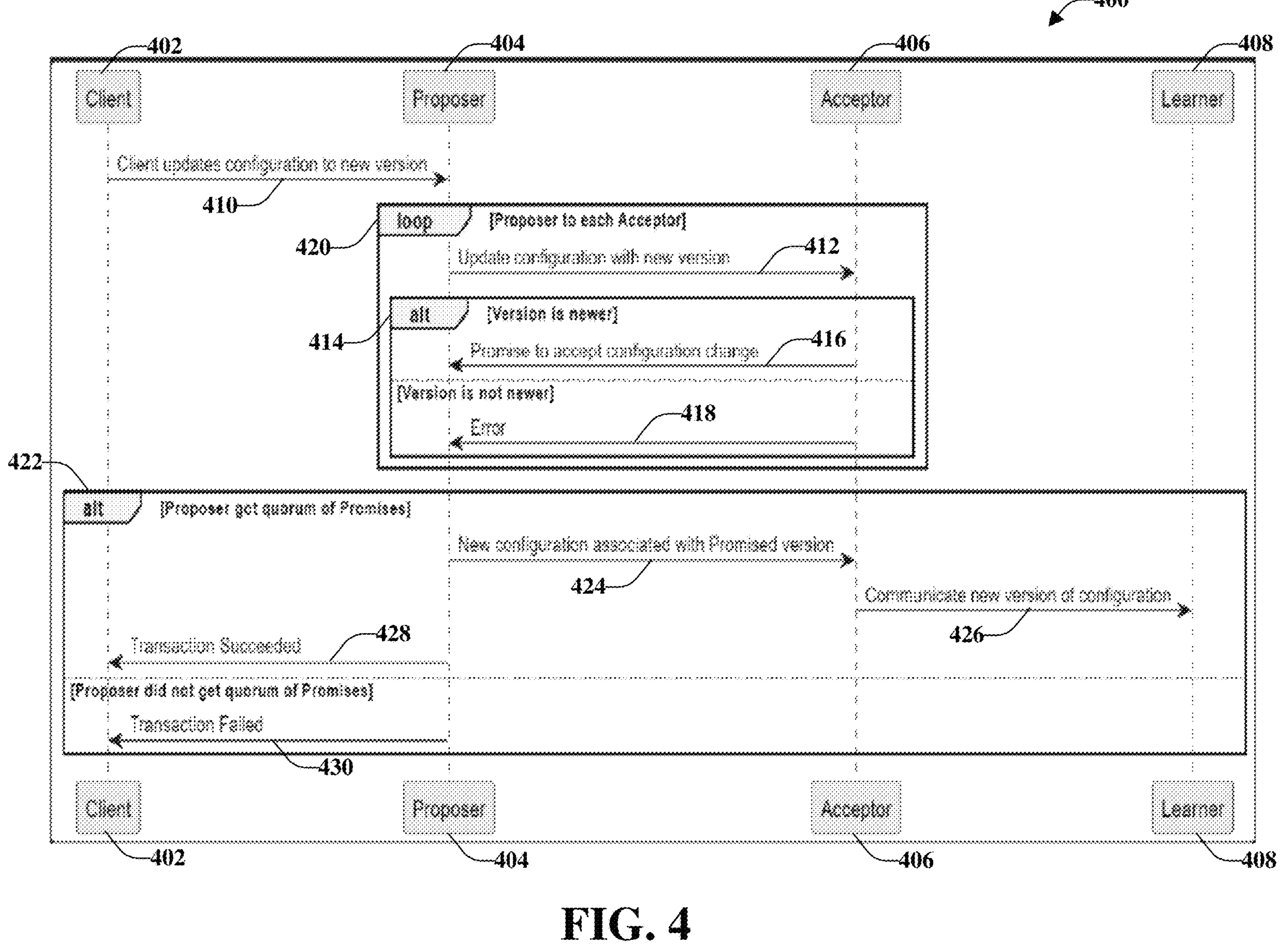
FIG. 4 illustrates an example, non-limiting, sequence diagram for conventional transactions on a cluster of nodes.

FIG. 4 illustrates an example, non-limiting, sequence diagram 400 for conventional Paxos transactions on OneFS. The sequence diagram 400 is illustrated at a high level for purposes of simplicity.

Illustrated are a client 402, a proposer 404, an acceptor 406, and a learner 408, which are configured to communicate with one another. It is noted that there is a single client and a single proposer. However, there are many acceptors and each acceptor has an associated learner (e.g., there are many learners).

At 410, the client 402 sends to the proposer 404 an update to a configuration from a current version to a new version. The proposer 404 sends to the acceptor 406 an updated configuration with the new version, at 412. Based on a result of a determination whether the version received, at 412, is a new version or not, the acceptor 406 replies to the proposer 404, as depicted by the alt box 414. For example, if the version received is a new version, the acceptor 406 can reply, at 416, with a promise to accept the configuration change. However, if the acceptor 406 determines that the version received, at 412, is not a new version, the acceptor 406 replies with an error message, at 418. As indicated by loop box 420, the messages sent at 412 and 416 or 418 are performed between each proposer 404 and each acceptor 406.

A determination is made whether the proposer 404 received a quorum of promises and depending on whether or not a quorum of promises is received, the alternative actions are performed, as indicated by the alt box 422. In an implementation, based on the proposer receiving a quorum of promises, at 424, the proposer 404 sends, at 424, a new configuration associated with the promised version to the acceptor 406. Upon or after receipt of the new configuration, the acceptor 406 communicates, at 426, the new version of configuration to the learner 408. A transaction succeeded message is returned to the client, at 428. In an alternative implementation, if the proposer did not receive a quorum of responses, at 430, a transaction failed message is returned to the client 402.

Since, in many cases, when it is desired to remove or smartfail a node from a cluster, the target node in question will not be available, it does not make sense to require that node to be available to agree it is being removed. Thus, the disclosed embodiments improve the consensus process to avoid needing consensus from down nodes.

Figure 5:
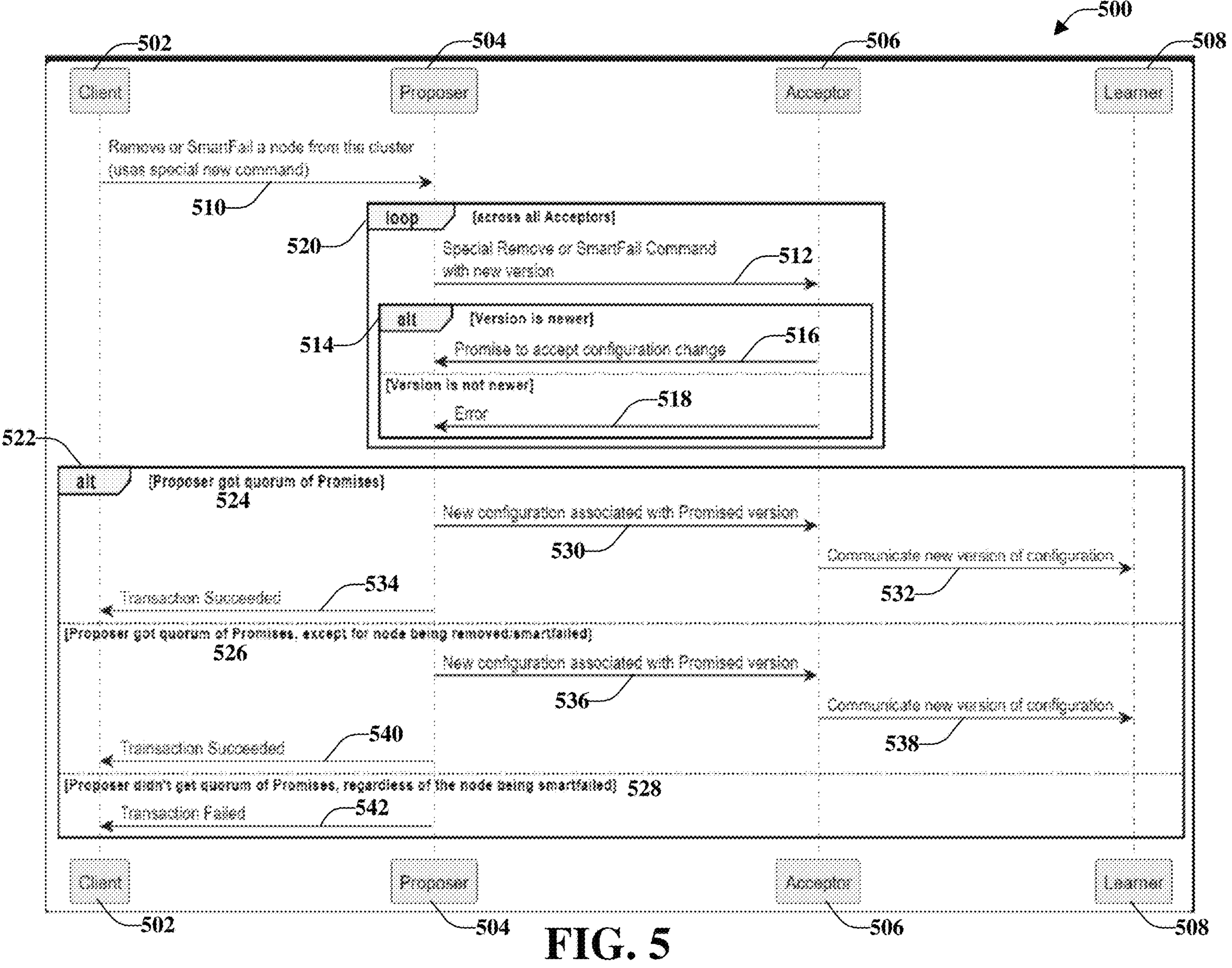
FIG. 5 illustrates an example, non-limiting, sequence diagram for dynamic adjustment of consensus parameters based on configuration operations in a distributed system in accordance with one or more embodiments described herein.

FIG. 5 illustrates an example, non-limiting, sequence diagram 500 for dynamic adjustment of consensus parameters based on configuration operations in a distributed system in accordance with one or more embodiments described herein. Similar to the sequence diagram 400 of FIG. 4, illustrated are a client 502, a proposer 504, an acceptor 506, and a learner 508, which are configured to communicate with one another. It is noted that there is a single client and a single proposer. However, there are many acceptors and each acceptor has an associated learner (e.g., there are many learners).

At 510, a command message is sent from the client 502 to the proposer 504 to remove or smartfail a node from the cluster. At 512, the proposer 504 sends a remove command and/or a smartfail command with the new version of the configuration to the acceptor 506. As indicated by the alternative box 514, a message is received from the acceptor 506 depending on whether or not the configuration is accepted. For example, if the version received at 512 is newer than a current version, at 516 the acceptor 506 replies with a promise to accept the configuration change. Alternatively, if the version is not newer than the current configuration, the acceptor 506 replies with an error message, at 518. As indicated by loop box 520, the messages sent at 512 and 516 or 518 are performed between each proposer 504 and each acceptor 506.

A determination is made whether the proposer 504 received a quorum of promises and, depending on whether or not a quorum of promises is received, the alternative actions are performed, as indicated by the alternative box 522. In the alternative box 522, there are three alternatives, namely, whether the proposer 504 received a quorum of promises 524, whether the proposer 504 received a quorum of promises, except for the node being removed/smartfailed 526, and the proposer 504 did not receive a quorum of promises 528, regardless of the nodes being removed or smartfailed.

In an implementation where the proposer receives a quorum of promises 524, the proposer 504 sends, at 530, a new configuration associated with the promised version to the acceptor 506. Upon or after receipt of the new configuration, the acceptor 506 communicates, at 532, the new version of the configuration to the learner 508. A transaction succeeded message is returned to the client, at 534.

In an implementation where the proposer receives a quorum of promises, except for the node being removed/smartfailed 526, the proposer 504 sends, at 536, a new configuration associated with the promised version to the acceptor 506. Upon or after receipt of the new configuration, the acceptor 506 communicates, at 538, the new version of the configuration to the learner 508. A transaction succeeded message is returned to the client, at 540.

Further, in an implementation where the proposer 504 did not receive a quorum of promises 528, a transaction failed message is returned to the client 402, at 542.

In is noted that, if the system cannot connect to and perform transactions with the node to be removed, the system should still do so, as updating more replicas of array.xml in one transaction is always better than needing the eventual consistency processes in isi_array_d to re-learn what has been already completed in the cluster. Additionally, each node always consults its local array.xml to determine if it is part of a cluster, so SmartFailing or removing the node should the node being removed to "reformat" itself such that it is not a part of any cluster and ready to be joined to another cluster if appropriate. However, if the node that is attempting to be removed or SmartFailed is unavailable, the system needs to be able to proceed with the consensus process as long as the remainder of a quorum is still intact.

In some implementations, both isi_config and isi_paxos can be enhanced to apply the "forgiveness process" above. For example, if isi_config was enhanced to retry when isi_paxos fails to talk to specific nodes, isi_paxos should also be enhanced to order to provide more specifics about how there was a failure to form the quorum for the Paxos transaction. Isi_paxos itself would need to be extended to be able to ignore specific nodes and treat the cluster as having fewer total nodes across which to compute the quorum so the Paxos process would be allowed to continue.

In an alternative implementation, the retry can be avoided. In this situation, the parameters can be set up to ignore specific devices during such a transaction so it does not fail at all. Specifically, a call through the isi_paxos library should be clearly expressible where certain nodes are explicitly ignored for their responses and the implications to the Paxos quorum.

Figure 6:
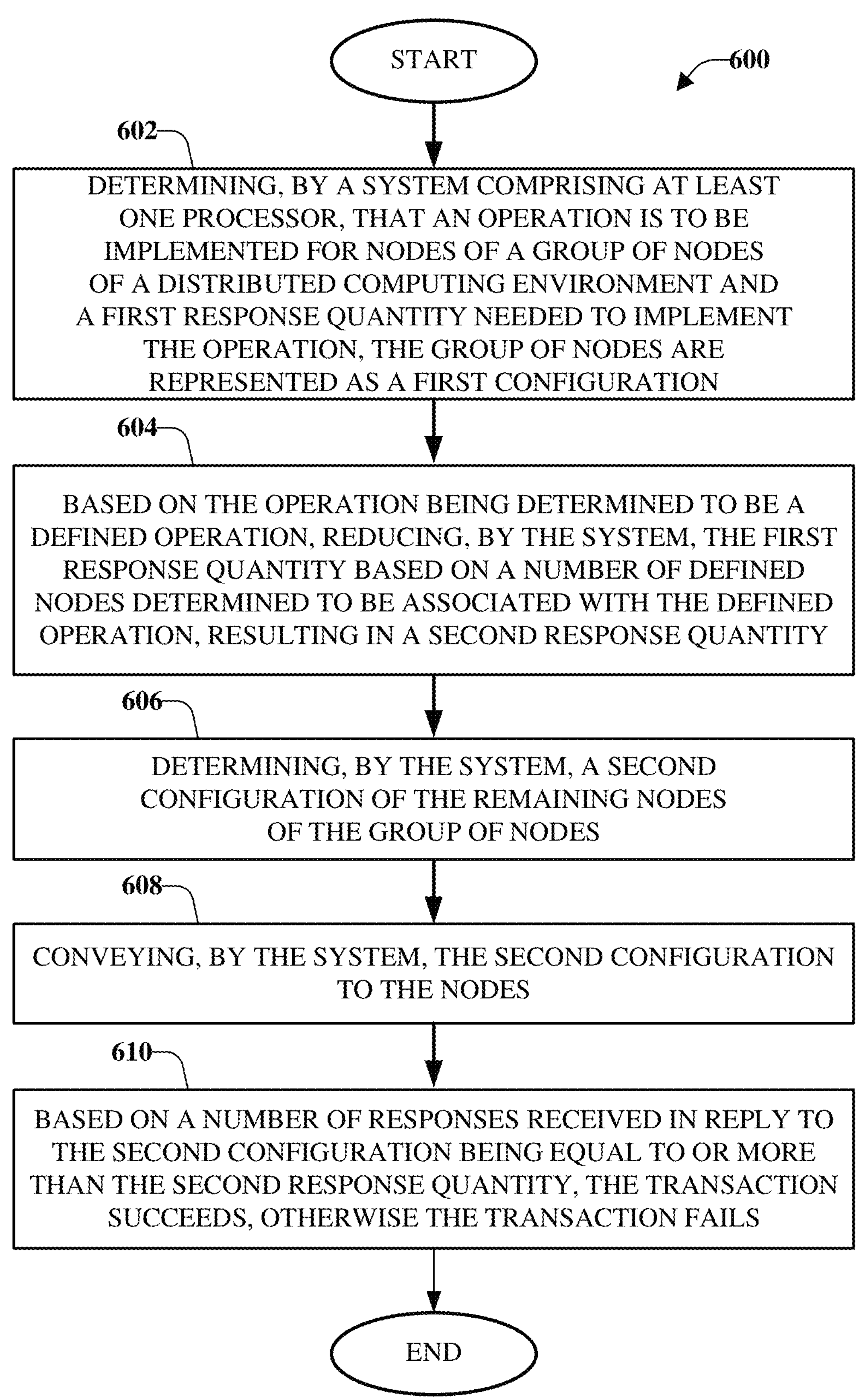
FIG. 6 illustrates an example, non-limiting, flow diagram of an example, non-limiting, computer-implemented method that facilitates a node configuration update based on dynamic adjustment of consensus parameters in a distributed system in accordance with one or more embodiments described herein.

FIG. 6 illustrates an example, non-limiting, flow diagram of an example, non-limiting, computer-implemented method 600 that facilitates a node configuration update based on dynamic adjustment of consensus parameters in a distributed system in accordance with one or more embodiments described herein. The computer-implemented method 600 and/or other methods discussed herein can be implemented by network equipment comprising a processor. According to another example, the computer-implemented method can be implemented by a system comprising a processor and a memory.

The computer-implemented method starts, at 602, with a determination that an operation is to be implemented for nodes of a group of nodes of a distributed computing environment. The operation to be implemented could be performed based on a consensus procedure where a majority of nodes in the configuration agree to the operation (e.g., promise to accept a configuration change). The number of nodes that represent the majority of nodes is defined as a first response quantity (e.g., a number of positive responses needed to implement the change) and represent a first configuration.

At 604, based on the operation being determined to be a defined operation, reducing, by the system, the first response quantity based on a number of defined nodes determined to be associated with the defined operation, resulting in a second response quantity. The defined operation can be a node remove operation and/or a smart fail operation. Thus, the defined nodes are the nodes to be removed according to the node remove operation and/or the nodes that are subject to the smart fail operation.

Further, at 606, a second configuration of the remaining nodes of the group of nodes is determined. The remaining nodes are the nodes that were not subject to the node remove operation and/or the smart fail operation. The second configuration is conveyed to the nodes, at 608. Based on a number of responses received in reply to the second configuration being equal to or more than the second response quantity, at 610, the transaction succeeds, otherwise, the transaction fails.

Figure 7:
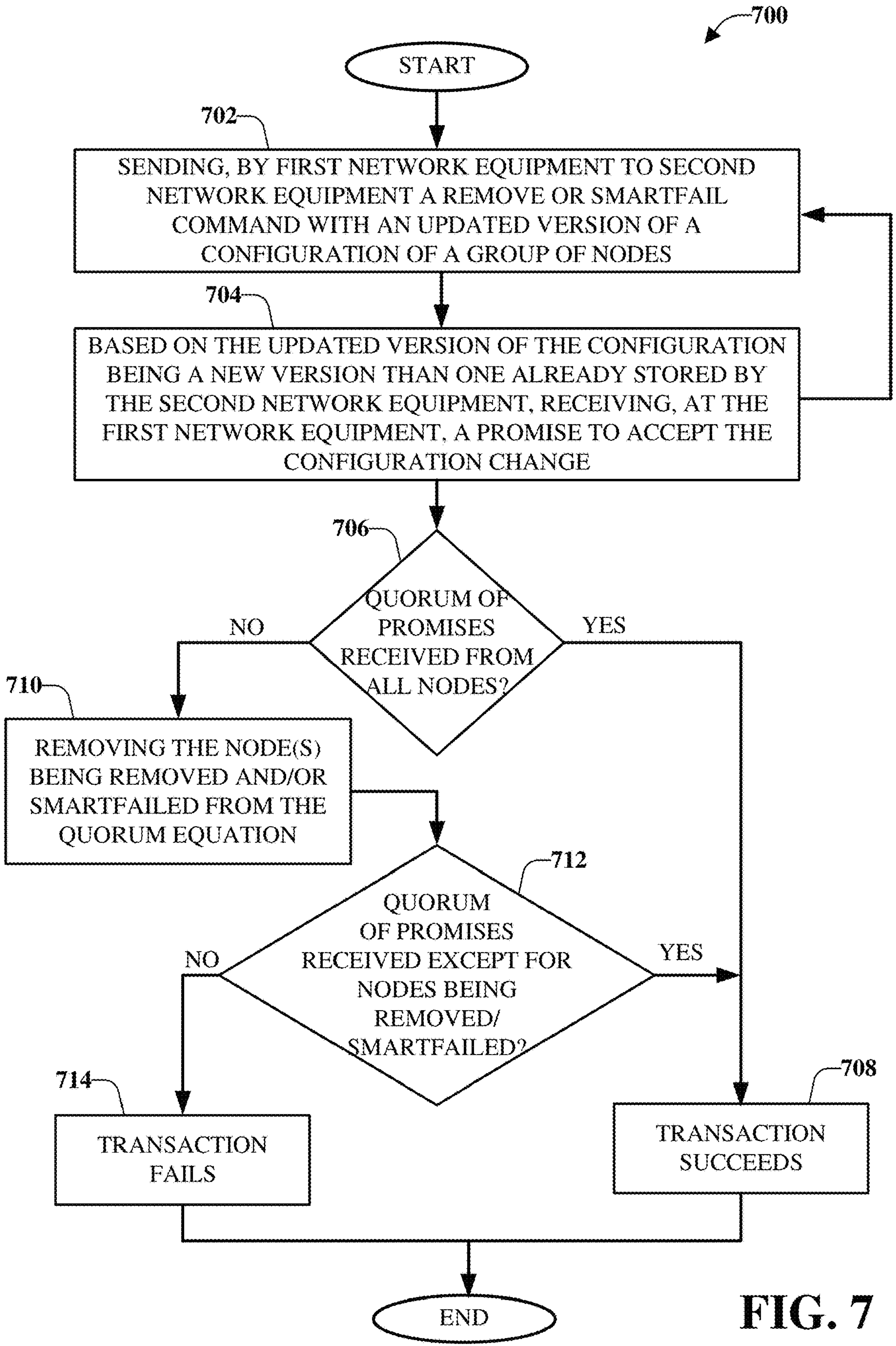
FIG. 7 illustrates an example, non-limiting, flow diagram of an example, non-limiting, computer-implemented method that facilitates updating a configuration of a cluster of nodes based on dynamic adjustment of consensus parameters in a distributed system in accordance with one or more embodiments described herein.

FIG. 7 illustrates an example, non-limiting, flow diagram of an example, non-limiting, computer-implemented method 700 that facilitates updating a configuration of a cluster of nodes based on dynamic adjustment of consensus parameters in a distributed system in accordance with one or more embodiments described herein. Repetitive description of like elements employed in other embodiments described herein is omitted for sake of brevity. The computer-implemented method 700 and/or other methods discussed herein can be implemented by network equipment comprising a processor. According to another example, the computer-implemented method can be implemented by a system comprising a processor and a memory.

The computer-implemented method starts, at 702, when first network equipment (e.g., the proposer 404) send to second network equipment (e.g., the acceptor 406) a remove or smartfail command with an updated version of a configuration of a group of nodes.

Based on the updated version of the configuration being a new version as compared to the version already stored by the second network equipment, a promise to accept the configuration change is received, at 704. Otherwise an error is received. It is to be understood that the sending of the command at 704 and the receiving the promise at 704 can be recursive, such that these actions are performed for all acceptors (e.g., second network equipment) in the group of nodes, as noted by the recursive arrow loop.

Upon or after responses are received (e.g., after a defined time interval), a determination is made whether a quorum of promises to accept the new configuration are received, at 706. If the quorum of promises is received ("YES"), at 708 the transaction succeeds. Alternatively, if is determined at 706 that a quorum is not received ("NO"), the node(s) being removed and/or smartfailed are removed from the quorum equation, at 710.

Thereafter, another determination is made, at 712, whether a quorum of promises is received, except for the node(s) being removed and/or smartfailed. If a quorum is received ("YES"), at 708 the transaction succeeds. Alternatively, if the quorum is not received ("NO"), at 714, the transaction fails.

Figure 8:
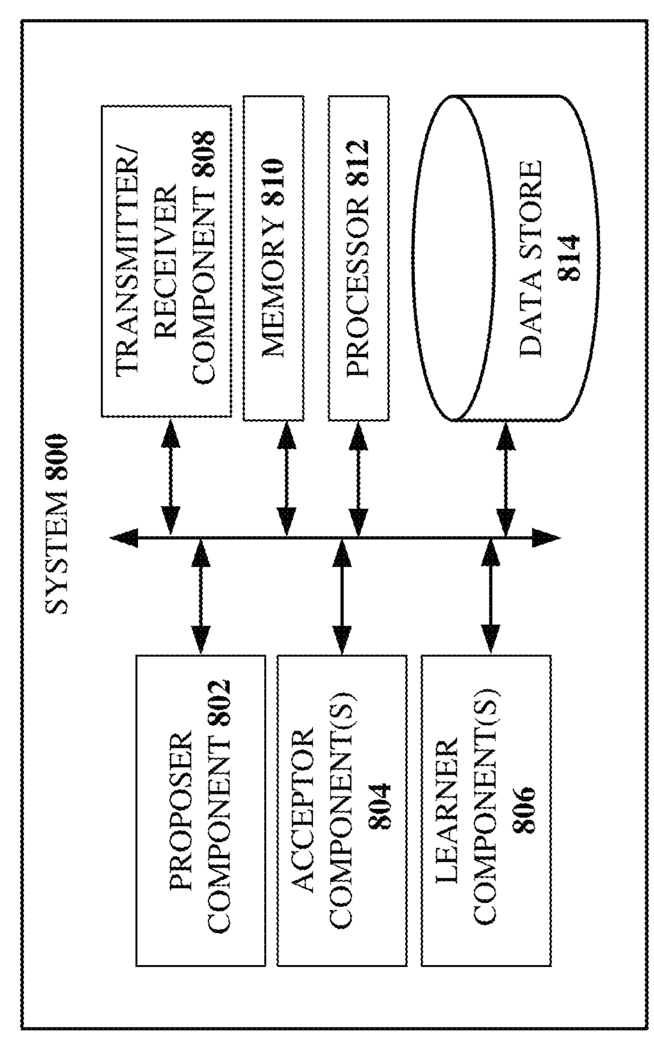
FIG. 8 illustrates an example, non-limiting, system for dynamic adjustment of consensus parameters based on configuration operations in distributed file systems in accordance with one or more embodiments described herein.

FIG. 8 illustrates an example, non-limiting, system 800 for dynamic adjustment of consensus parameters based on configuration operations in distributed file systems in accordance with one or more embodiments described herein. Repetitive description of like elements employed in other embodiments described herein is omitted for sake of brevity. The system 800 can comprise one or more of the components and/or functionality of the computing devices of and/or the computer-implemented methods discussed herein, and vice versa.

Aspects of systems (e.g., the system 800 and the like), devices, apparatuses, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 800 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 800 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated, the system 800 can include a proposer component 802 (e.g., the proposer 504), an acceptor component 804 (e.g., the acceptor 506), a learner component 806 (e.g., the learner 508), a transmitter/receiver component 808, at least one memory 810, at least one processor 812, and at least one data store 814. It is noted that there can be multiple acceptor components and associated multiple learner components, however, only one of each is illustrated and described for purposes of simplicity.

The at least one memory 810 can store computer executable components and instructions. The at least one processor 812 can facilitate execution of the instructions (e.g., computer executable components and corresponding instructions) by the proposer component 802, the acceptor component 804, the learner component 806, and/or other system components. As depicted, in some embodiments, one or more of the proposer component 802, the acceptor component 804, the learner component 806, the transmitter/receiver component 808, the at least one memory 810, the at least one processor 812, and at least one data store 814 can be electrically, communicatively, and/or operatively coupled to one another to perform one or more functions of the system 800.

The proposer component 802 is configured to receive a command that includes information indicative of an operation that is to be performed with respect to a cluster of nodes. Examples of the operations can include, but are not limited to, a command to remove a node (or multiple nodes) from the cluster of nodes and/or a smart fail command with respect to a node (or multiple nodes) in the cluster.

Based on the command, the proposer component 802 communicates the command and a new version of a configuration of the cluster of nodes to each acceptor component 804. The acceptor component 804 conveys the information to its associated learner component 806. Based on the new version of the configuration being determined to be a newer version, the acceptor component 804 replies to the proposer component 802 with a promise to accept the configuration change (e.g., to the new configuration). If the new version of the configuration is determined to not be a newer version, acceptor component 804 replies with an error message, which is received by the proposer component 802.

After a defined interval of time in which the replies are to be received at the proposer component 802 from each of acceptor component of the multiple acceptor components, a determination is made whether a quorum of affirmative responses has been received by the proposer component 802. If a quorum is received, the proposer component 802 sends the new configuration associated with the promised version to each acceptor component 804. Each acceptor component 804 communicates the new version of the configuration to its associated learner component 806. Thereafter, a transaction succeeded message is sent from the proposer component 802 in response to the original command received.

If the quorum of replies are not received, the nodes that are the subject of the remove node command and/or the smart fail command are removed from the quorum determination. Upon or after the updated quorum amount is determined, another determination is made whether a quorum of affirmative responses has been received by the proposer component 802. If a quorum is received, the proposer component 802 sends the new configuration associated with the promised version to each acceptor component 804. Each acceptor component 804 communicates the new version of the configuration to its associated learner component 806. Thereafter, a transaction succeeded message is sent from the proposer component 802 in response to the original command received.

Alternatively, if the proposer component 802 did not receive a quorum of promises, regardless of the node being removed and/or smart failed being removed from the quorum determination, the proposer component 802 sends a transaction failed message in response to original command received.

The at least one memory 810 can be operatively connected to the at least one processor 812. The at least one memory 810 can store executable instructions and/or computer executable components (e.g., the proposer component 802, the acceptor component 804, the learner component 806, the transmitter/receiver component 808, and so on) that, when executed by the at least one processor 812 can facilitate performance of operations (e.g., the operations discussed with respect to the various methods and/or systems discussed herein). Further, the at least one processor 812 can be utilized to execute computer executable components (e.g., the proposer component 802, the acceptor component 804, the learner component 806, the transmitter/receiver component 808, and so on) stored in the at least one memory 810.

For example, the at least one memory 810 can store protocols associated with facilitating dynamic adjustment of consensus parameters based on configuration operations in a distributed system as discussed herein. Further, the at least one memory 810 can facilitate action to control communication between the system 800 and other node devices, one or more file storage systems, one or more devices, such that the system 800 employ stored protocols and/or processes to achieve improved overall performance of distributed file systems as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 812 can facilitate respective analysis of information related to antivirus scanning and file locking. The at least one processor 812 can be a processor dedicated to analyzing and/or generating information received, a processor that controls one or more components of the system 800, and/or a processor that both analyzes and generates information received and controls one or more components of the system 800.

The transmitter/receiver component 808 can receive one or more commands and/or response as discussed herein. The transmitter/receiver component 808 can be configured to transmit to, and/or receive data from, for example, a client, network equipment, the proposer component 802, the acceptor component 804, the learner component 806, and/or other communication devices. Through the transmitter/receiver component 808, the system 800 can concurrently transmit and receive data, can transmit and receive data at different times, or combinations thereof.

It should be noted that terms such as “real-time,” “near real-time,” “dynamically,” “instantaneous,” “continuously,” and the like can refer to data which is collected and processed at an order without perceivable delay for a given context, the timeliness of data or information that has been delayed only by the time required for electronic communication, actual or near actual time during which a process or event occur, and temporally present conditions as measured by real-time software, real-time systems, and/or high-performance computing systems. Real-time software and/or performance can be employed via synchronous or non-synchronous programming languages, real-time operating systems, and real-time networks, each of which provide frameworks on which to build a real-time software application. A real-time system may be one where its application can be considered (within context) to be a main priority. In a real-time process, the analyzed (input) and generated (output) samples can be processed (or generated) continuously at the same time (or near the same time) it takes to input and output the same set of samples independent of any processing delay.

Example, non-limiting Non-Real Time RAN Intelligent Controller (Non-RT RIC) functions include service and policy management, RAN analytics, and model training for the near-Real Time RICs. In this regard, the Non-RT-RIC enables non-real-time (e.g., a first range of time, such as >1 second) control of RAN elements and their resources through applications, e.g., specialized applications called rApps. Example, non-limiting Near-Real Time RAN Intelligent Controller (Near-RT RIC) functions enable near-real-time optimization and control and data monitoring of O-CU and O-DU nodes in near-RT timescales (e.g., a second range of time representing less time than the first time range, such as between 10 milliseconds and 1 second). In this regard, the Near-RT RIC controls RAN elements and their resources with optimization actions that typically take about 10 milliseconds to about one second to complete, although different time ranges can be selected. The Near-RT RIC can receive policy guidance from the Non-RT-RIC and can provide policy feedback to the Non-RT-RIC through specialized applications called xApps. In this regard, a Real Time RAN Intelligent Controller (RT RIC) can be designed to manage network functions at real time timescales (e.g., a third range of time representing less time than the first time range and the second time range, such as <10 milliseconds).

Methods that can be implemented in accordance with the disclosed subject matter will be better appreciated with reference to the flow charts provided herein. While, for purposes of simplicity of explanation, the methods are shown and described as a series of flows and/or blocks, it is to be understood and appreciated that the disclosed aspects are not limited by the number or order of flows and/or blocks, as some flows and/or blocks can occur in different orders and/or at substantially the same time with other blocks from what is depicted and described herein. Moreover, not all illustrated flows and/or blocks are required to implement the disclosed methods. It is to be appreciated that the functionality associated with the flows and/or blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Aspects of systems, devices, apparatuses, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As used herein, the term “storage device,” “first storage device,” “second storage device,” “storage cluster nodes,” “storage system,” and the like (e.g., node device), can include, for example, private or public cloud computing systems for storing data as well as systems for storing data comprising virtual infrastructure and those not comprising virtual infrastructure. The term “I/O request” (or simply “I/O”) can refer to a request to read and/or write data.

The term “cloud” as used herein can refer to a cluster of nodes (e.g., set of network servers), for example, within an object storage system, which are communicatively and/or operatively coupled to one another, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with one another to provide resources for end-users.

Further, the term "storage device" can refer to any Non-Volatile Memory (NVM) device, including Hard Disk Drives (HDDs), flash devices (e.g., NAND flash devices), and next generation NVM devices, any of which can be accessed locally and/or remotely (e.g., via a Storage Attached Network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

Further, a storage cluster can include one or more storage devices. For example, a storage system can include one or more clients in communication with a storage cluster via a network. The network can include various types of communication networks or combinations thereof including, but not limited to, networks using protocols such as Ethernet, Internet Small Computer System Interface (ISCSI), Fibre Channel (FC), and/or wireless protocols. The clients can include user applications, application servers, data management tools, and/or testing systems.

As utilized herein an "entity," "client," "user," and/or "application" can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

Figure 9:
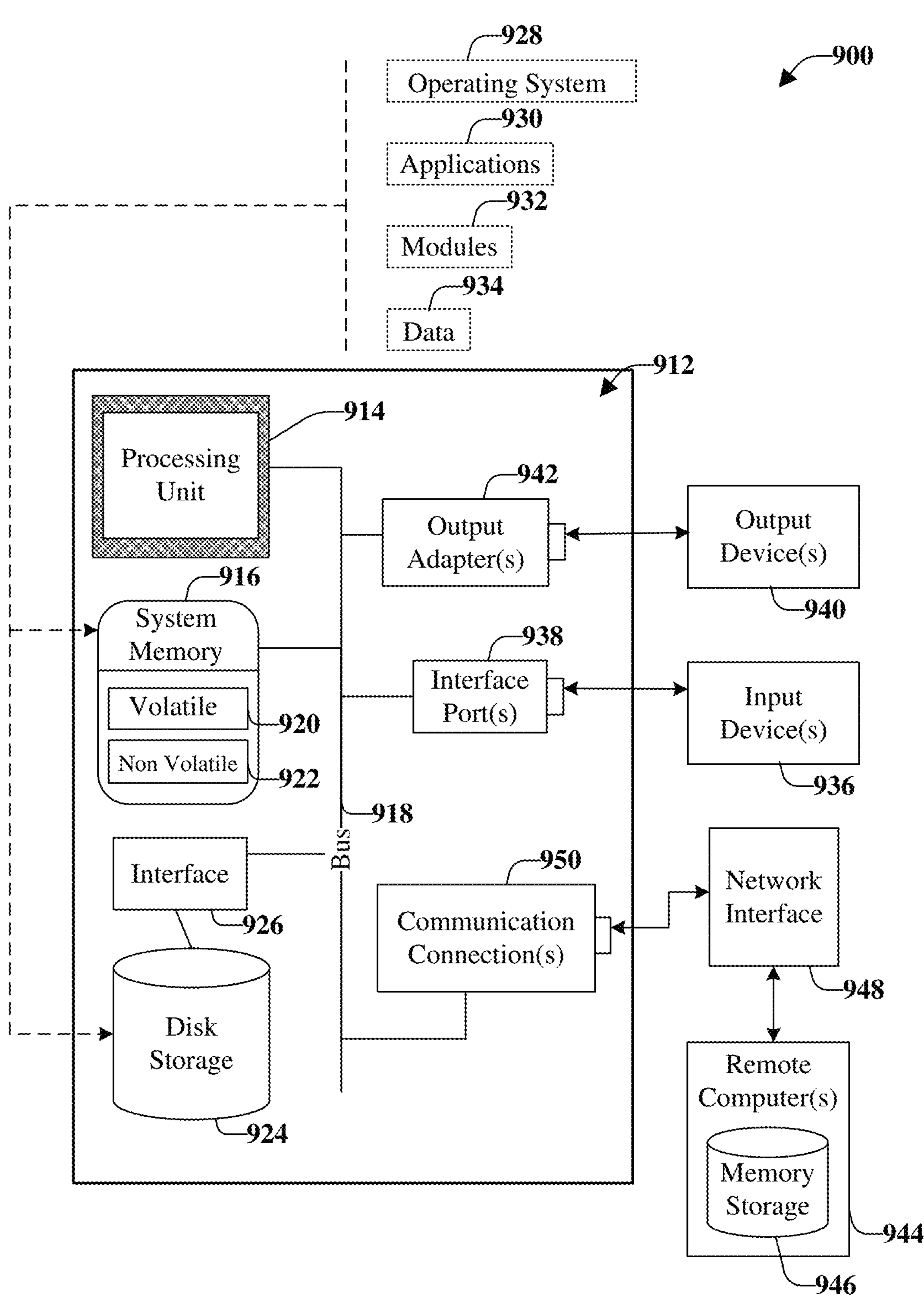
FIG. 9 illustrates an example, non-limiting, computing environment in which one or more embodiments described herein can be facilitated.

In order to provide a context for the various aspects of the disclosed subject matter, FIG. 9 as well as the following discussion are intended to provide a brief, general description of a suitable environment in which the various aspects of the disclosed subject matter can be implemented.

With reference to FIG. 9, an example environment 910 for implementing various aspects of the aforementioned subject matter comprises a computer 912. The computer 912 comprises a processing unit 914, a system memory 916, and a system bus 918. The system bus 918 couples system components including, but not limited to, the system memory 916 to the processing unit 914. The processing unit 914 can be any of various available processors. Multi-core microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 comprises volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can comprise read only memory (ROM), programmable ROM (PROM), electrically programmable ROM (EPROM), electrically erasable PROM (EEPROM), or flash memory. Volatile memory 920 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also comprises removable/non-removable, volatile/non-volatile computer storage media. FIG. 9 illustrates, for example a disk storage 924. Disk storage 924 comprises, but is not limited to, devices like a magnetic disk drive, floppy disk drive, tape drive, Jaz drive, Zip drive, LS-100 drive, flash memory card, or memory stick. In addition, disk storage 924 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used such as interface 926.

It is to be appreciated that FIG. 9 describes software that acts as an intermediary between users and the basic computer resources described in suitable operating environment 910. Such software comprises an operating system 928. Operating system 928, which can be stored on disk storage 924, acts to control and allocate resources of the computer 912. System applications 930 take advantage of the management of resources by operating system 928 through program modules 932 and program data 934 stored either in system memory 916 or on disk storage 924. It is to be appreciated that one or more embodiments of the subject disclosure can be implemented with various operating systems or combinations of operating systems.

A user enters commands or information into the computer 912 through input device(s) 936. Input devices 936 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 comprise, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapters 942 are provided to illustrate that there are some output devices 940 like monitors, speakers, and printers, among other output devices 940, which require special adapters. The output adapters 942 comprise, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically comprises many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5, and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the system bus 918. While communication connection 950 is shown for illustrative clarity inside computer 912, it can also be external to computer 912. The hardware/software necessary for connection to the network interface 948 comprises, for exemplary purposes only, internal, and external technologies such as, modems including regular telephone grade modems, cable modems and DSL modems, ISDN adapters, and Ethernet cards.

Figure 10:
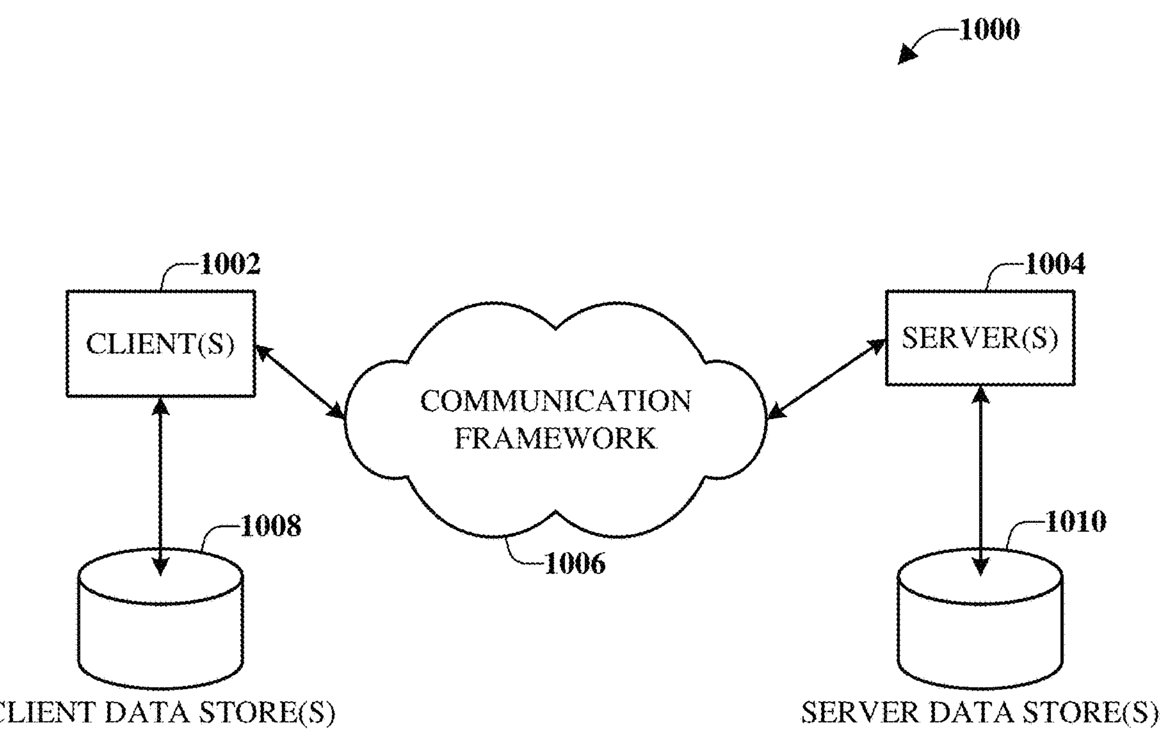
FIG. 10 illustrates an example, non-limiting, networking environment in which one or more embodiments described herein can be facilitated.

FIG. 10 is a schematic block diagram of a sample computing environment 1000 with which the disclosed subject matter can interact. The sample computing environment 1000 includes one or more client(s) 1002. The client(s) 1002 can be hardware and/or software (e.g., threads, processes, computing devices). The sample computing environment 1000 also includes one or more server(s) 1004. The server(s) 1004 can also be hardware and/or software (e.g., threads, processes, computing devices). The servers 1004 can house threads to perform transformations by employing one or more embodiments as described herein, for example. One possible communication between a client 1002 and servers 1004 can be in the form of a data packet adapted to be transmitted between two or more computer processes. The sample computing environment 1000 includes a communication framework 1006 that can be employed to facilitate communications between the client(s) 1002 and the server(s) 1004. The client(s) 1002 are operably connected to one or more client data store(s) 1008 that can be employed to store information local to the client(s) 1002. Similarly, the server (s) 1004 are operably connected to one or more server data store(s) 1010 that can be employed to store information local to the servers 1004.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. Yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, radon access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

Disclosed embodiments and/or aspects should neither be presumed to be exclusive of other disclosed embodiments and/or aspects, nor should a device and/or structure be presumed to be exclusive to its depicted element in an example embodiment or embodiments of this disclosure, unless where clear from context to the contrary. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of elements (or embodiments) into a single device achieving aggregate functionality, where suitable, or distribution of functionality of a single device into multiple device, where suitable. In addition, incorporation, combination or modification of devices or elements (e.g., components) depicted herein or modified as stated above with devices, structures, or subsets thereof not explicitly depicted herein but known in the art or made evident to one with ordinary skill in the art through the context disclosed herein are also considered within the scope of the present disclosure.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

determining, by a system comprising at least one processor, that an operation is to be implemented for nodes of a group of nodes of a distributed computing environment, wherein performance of the operation is based on a consensus procedure, and wherein a first response specification of the consensus procedure is a function of a first response quantity that is based on a first quantity of nodes determined to be in the group of nodes;

based on the operation being determined to be a defined operation, reducing, by the system, the first response quantity based on a number of defined nodes determined to be associated with the defined operation, resulting in a second response quantity; and based on an amount of responses received in reply to a request to implement the defined operation being determined to satisfy the second response quantity, facilitating, by the system, implementation of the defined operation; or based on the amount of responses received in reply to the request to implement the defined operation being determined to fail to satisfy the second response quantity, determining, by the system, that the defined operation is not to be implemented; and based on the operation being determined not to be the defined operation, determining, by the system, whether a number of responses satisfy the first response quantity, and based on the number of responses being determined to satisfy the first response quantity, facilitating, by the system, the implementation of the operation, or based on the number of responses being determined not to satisfy the first response quantity, determining, by the system, that the operation is not to be implemented.

2. The method of claim 1, wherein the defined operation is a node remove operation.

3. The method of claim 2, wherein the defined nodes determined to be associated with the defined operation comprise nodes identified in the node remove operation for removal from the group of nodes, resulting in remaining nodes of the group of nodes.

4. The method of claim 3, wherein the group of nodes is a first group of nodes, wherein a first configuration is associated with the first group of nodes, and wherein the method further comprises:

determining, by the system, a second configuration of the remaining nodes of the group of nodes; and communicating, by the system, the second configuration to the remaining nodes of the group of nodes.

5. The method of claim 1, wherein the defined operation is a smart fail operation.

6. The method of claim 5, wherein the defined nodes determined to be associated with the defined operation comprise nodes identified in the smart fail operation as nodes that have experienced a failure event, wherein the method further comprises:

removing, by the system, the defined nodes from the group of nodes, resulting in remaining nodes of the group of nodes.

7. The method of claim 6, wherein the group of nodes is a first group of nodes, wherein a first configuration is associated with the first group of nodes, and wherein the method further comprises:

determining, by the system, a second configuration of the remaining nodes of the group of nodes; and communicating, by the system, the second configuration to the remaining nodes of the group of nodes.

8. The method of claim 1, wherein the first response quantity of the first response specification is a first quorum a total amount of nodes in the group of nodes, and wherein the second response quantity of a second response specification is a second quorum of a remaining amount of nodes in the group of nodes after the reducing.

9. The method of claim 1, wherein the distributed computing environment is configured to operate according to at least a fifth generation radio network communication protocol.

10. A system, comprising:

at least one processor; and at least one memory that stores executable instructions that, when executed by the at least one processor, facilitate performance of operations, comprising:

based on a first determination that a defined command is to be implemented for nodes of a group of nodes of a distributed computing environment, modifying a response parameter associated with a consensus procedure for implementation of the defined command, wherein the modifying comprises reducing a number of nodes participating in the consensus procedure by a quantity of nodes with respect to which the defined command is to be implemented, resulting in a modified response parameter;

based on a second determination that a response quantity satisfies the modified response parameter, initiating the defined command;

based on a third determination that the response quantity fails to satisfy the modified response parameter, determining that the defined command is not to be implemented; and based on a fourth determination that a command, other than the defined command, is to be implemented for the nodes, determining whether a number of responses satisfy a first response quantity, and based on the number of responses being determined to satisfy the first response quantity, implementing the operation, or based on the number of responses being determined not to satisfy the first response quantity, determining that the operation is not to be implemented.

11. The system of claim 10, wherein the defined command is a node remove command.

12. The system of claim 10, wherein the defined command is a smart fail command.

13. The system of claim 10, wherein the modified response parameter is based on a quorum of a remaining amount of nodes in the group of nodes after the reducing of the number of nodes participating in the consensus procedure.

14. The system of claim 10, wherein the distributed computing environment is configured to operate according to at least a new radio network communication protocol.

15. The system of claim 10, wherein the defined command is a node remove command, and wherein the defined nodes determined to be associated with the defined command comprise nodes identified in the node remove command for removal from the group of nodes, resulting in remaining nodes of the group of nodes.

16. The system of claim 10, wherein the defined command is a smart fail command, and wherein the defined nodes determined to be associated with the defined command comprise nodes identified in the smart fail operation as nodes that have experienced a failure event, wherein the operations further comprise:

removing the defined nodes from the group of nodes, resulting in remaining nodes of the group of nodes.

17. A non-transitory machine-readable medium, comprising executable instructions that, when executed by at least one processor of network equipment, facilitate performance of operations, wherein the operations comprise:

determining that a command is to be implemented for nodes of a group of nodes of a distributed computing environment, wherein an implementation of the command is based on a consensus procedure, and wherein a first response requirement of the consensus procedure is based on a first response quantity that is a function of a quantity of nodes determined to be in the group of nodes;

based on the command being determined to be a defined command, reducing the first response quantity by a number of defined nodes determined to be associated with the defined command, resulting in a second response quantity, and based on a number of positive responses received in reply to a request to implement the defined command being determined to satisfy the second response quantity, implementing the defined command; or based on the second response quantity being determined not to be satisfied, foregoing the implementing of the defined command; and based on the command being determined not to be the defined command, determining, whether a number of responses satisfy the first response quantity, and based on the number of responses being determined to satisfy the first response quantity, facilitating the implementation of the command, or based on the number of responses being determined not to satisfy the first response quantity, determining that the command is not to be implemented.

18. The non-transitory machine-readable medium of claim 17, wherein the defined command is a node remove command or a smart fail command.

19. The non-transitory machine-readable medium of claim 18, wherein the defined nodes determined to be associated with the defined command comprise nodes identified in the node remove operation for removal from the group of nodes, resulting in remaining nodes of the group of nodes.

20. The non-transitory machine-readable medium of claim 18, wherein the defined nodes determined to be associated with the defined command comprise nodes identified in the smart fail operation as nodes that have experienced a failure event, wherein the operations further comprise:

removing the defined nodes from the group of nodes, resulting in remaining nodes of the group of nodes.

* * * * *